United States Patent [19]

Moretti et al.

[11] Patent Number: 5,224,805

[45] Date of Patent: Jul. 6, 1993

[54] ANCHORING PLUG

[75] Inventors: Erminio Moretti, Grenoble; Gaetan D'Aloia, Echirolles; Jean-Louis J'Espere, Seyssinet-Pariset, all of France

[73] Assignee: A. Raymond & Cie, Grenoble-Cedex, France

[21] Appl. No.: 986,367

[22] Filed: Dec. 7, 1992

[30] Foreign Application Priority Data

Dec. 9, 1991 [DE] Fed. Rep. of Germany ....... 4140512

[51] Int. Cl.⁵ .................. F16B 13/04; F16B 13/06
[52] U.S. Cl. .................................. 411/30; 411/55; 411/60
[58] Field of Search .............. 411/29, 30, 31, 55, 411/60, 61, 62, 340, 15

[56] References Cited

U.S. PATENT DOCUMENTS

| 3,315,558 | 4/1967 | Fischer | 411/15 |
| 3,342,098 | 9/1967 | Schuplin | 411/15 |
| 3,431,813 | 3/1969 | Johnson. | |
| 4,462,729 | 7/1984 | Uhlig et al. | 411/15 |
| 4,765,788 | 8/1988 | Nowak et al. | 411/61 |
| 4,874,277 | 10/1989 | Nowak et al. | 411/61 |
| 5,100,273 | 3/1992 | Vassiliou | 411/30 |

Primary Examiner—Neill R. Wilson
Attorney, Agent, or Firm—Finnegan, Henderson, Farabow, Garrett & Dunner

[57] ABSTRACT

An anchoring plug made from a hard-elastic plastic material having a closed shank part 1 and two mutually opposite spreading fingers 2 and 3. A screw hole 10, extends through the shank part 1 down into a central space 12 between the spreading fingers for receipt of a screw 18. To be able to drive the plug directly into gypsum board without having to first drill a hole, one spreading finger 2 is longer than the other spreading finger and has a hook-shaped tip 4 forming a recess 5 at its free end. Initially the end of the shorter spreading finger 3 nests in this recess to provide a pointed end to the plug, but springs free of the recess when a screw is screwed into the plug.

6 Claims, 2 Drawing Sheets

ANCHORING PLUG

BACKGROUND OF THE INVENTION

This invention relates to an anchoring plug made of a hard-elastic plastic material. These plugs typically are used for fastening structural parts to bearer elements such as, for example, walls, floors or even ceilings. Floors are generally of a hard material such as concrete, bricks or the like. In these cases, it is necessary to first drill a hole in the element corresponding to the diameter and length of the shank of the plug in order to be able to insert the plug into this hole and then screw a fastener into it.

For ceilings and walls, use is often made of gypsum or plasterboard which is approximately 1 cm thick. If it is desired to insert such a plug into this, then a hole must also first be drilled in it, even though this material is soft enough that a harder pin such as a nail, for example, can be driven into it without any difficulty.

A plastic plug of this type is shown in U.S. Pat. No. 3,431,813. This plug was developed especially for use with plasterboard and has collapsible, sharply pointed spreading fingers for holding the plug in place. With this plug also, a hole has to be pre-drilled in the board of at least a sufficient diameter to ensure that the tip of the plug is held together by the rim of the hole when the plug is driven into it.

An object of the present invention is to provide the above-mentioned plastic anchoring plug such that, without any impairment of its function, it can be used both into elements made from hard materials as well as softer materials such as gypsum board and can be subsequently anchored therein, a pre-drilling no longer being required in the case of gypsum board.

SUMMARY OF THE INVENTION

This object is achieved according to the present invention by providing an anchoring plug of a hard-elastic plastic material for fastening objects to bearer elements comprising a shank portion having a central opening extending therethrough, a pair of downwardly extending spreading fingers located on opposite sides of the center line of the opening and connected at their upper ends to the shank portion, one spreading finger being longer than the other spreading finger and having a hook shaped, pointed tip at its free end opposite from the shank portion. The tip has an upwardly extending nose forming a recess therein, the free end of the shorter finger nesting in this recess and being held therein by the nose, whereby, after insertion of the plug into an element, insertion of a spreading member through the opening in the shank portion of the plug forces the shorter finger past the nose and out of the recess in the longer finger and spreads the fingers apart to grip the element.

BRIEF DESCRIPTION OF THE DRAWINGS

An illustrative embodiment of the invention is described in greater detail below and is illustrated in the following drawings, in which.

DETAILED DESCRIPTION OF THE INVENTION

Figure 1:
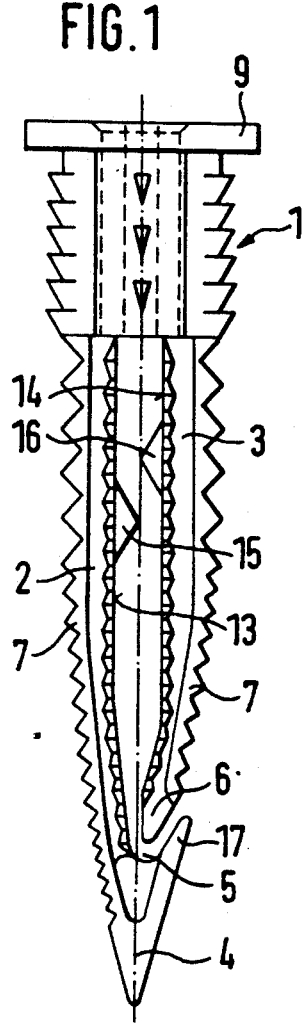
FIG. 1 is a side view of the plastic plug of this invention.

The plastic anchoring plug shown in the drawings includes a closed, annular upper shank portion or part 1 and two downwardly, extending spreading fingers 2 and 3 located on opposite sides of the center line of the plug, spreading finger 2 being somewhat longer than the spreading finger 3.

The longer spreading finger 2 has a pointed, hook-shaped tip 4 having a recess 5 into which the pointed end 6 of spreading finger 3 nests in the delivery and insertion state.

Figure 2:
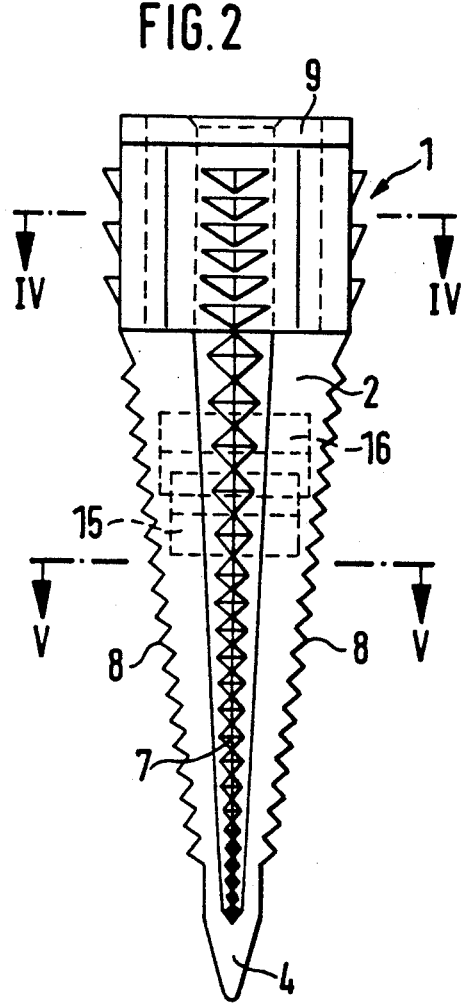
FIG. 2 is a front view of the plug.
Figure 3:
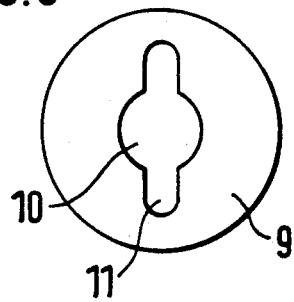
FIG. 3 is a top view of the plug.
Figure 4:
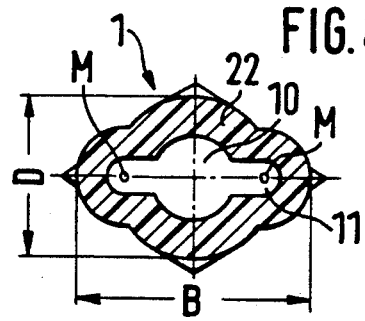
FIG. 4 is a sectional view through the plug's shank taken along the line IV—IV in FIG. 2.

Spreading fingers 2 and 3 are configured from the shank part 1 down to their tips in the shape of a pointed arch and have serrations 7 on their outer sides. In addition, sawtooth-shaped serrations 8 are provided on the mutually opposite outer side edges of the fingers 2 and 3. See FIG. 2.

Figure 5:
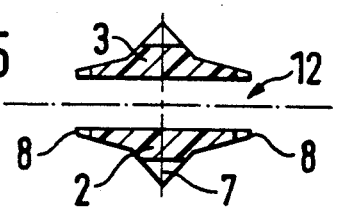
FIG. 5 is a sectional view through the plug's spreading fingers taken along the line V—V in FIG. 2.

Closed shank part 1 is approximately elliptical in cross-section and has a circular cover plate 9 that extends outwardly from the sides of the shank part. A central opening 10 for receipt of a spreading member, such as a screw 18, extends through cover plate 9 and shank part 1 in alignment with the central space 12 between the two fingers 2 and 3. Two channels 11 extend outwardly toward the midpoints of the elliptical ends of the shank part from either side of opening 10 and downwardly through the part to the central opening or gap 12, between the oppositely facing inner walls 13 and 14 of spreading fingers 2 and 3. As shown in FIG. 5, gap 12 is open to both sides.

On the opposing inner walls 13 and 14 of spreading fingers 2 and 3, approximately in their upper half, are integrally formed spreading cams 15 and 16, of which spreading cam 16 on the shorter spreading finger 3 is preferably located above spreading cam 15 on the longer spreading finger 2.

Hook tip 4 is configured such that its upwardly extending nose 17 extends over and covers the pointed end 6 of shorter spreading finger 3, to hold the finger 3 in the recess 5 in finger 2 and provide a sharp, pointed end to the plug as it is being inserted into the bearer element, but only so far as to still permit the end 6 to be pulled free of recess 5 when a screw 18 is screwed into the plug so that the fingers 2 and 3 can be spread apart.

The sawtooth-shaped serrations 8 on the side edges of the spreading fingers make it easier for the plug to be driven into gypsum board and ensure a neat "sawn" or cut hole corresponding to the elliptical shank, so that, when a screw is screwed in, the shank part will be pressed firmly against the surrounding gypsum board.

The spreading cams 15, 16 on the inner walls of the spreading fingers additionally enhance the spreading effect of the spreading fingers. This is particularly important in cases where the plugs are anchored in boards where the spreading fingers freely diverge behind the board and the plug finds its hold essentially around the inner rim of the hole.

Figure 6:
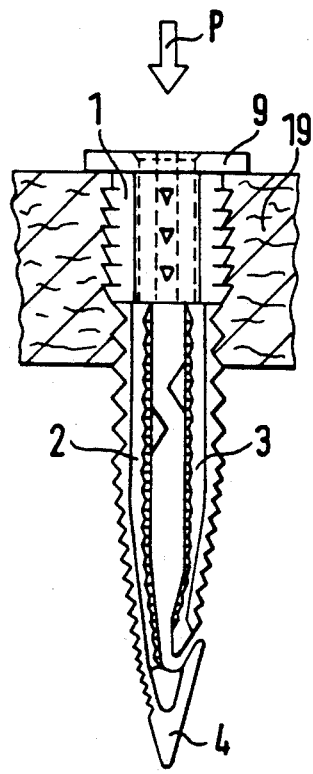
FIG. 6 shows the plug driven into a gypsum board.

FIGS. 6 through 9 show two optional ways to use the plug of the invention. FIG. 6 shows the plug with its spreading fingers 2 and 3 still hooked-together after the plug has been driven into a gypsum or plasterboard 19, the plug having been driven into the board with a hammer (not shown) in the direction of arrow P. The gypsum in the board 19 is easily penetrated by tip 4 and cut through by the sawtooth shaped serrations 8 on the two fingers 2 and 3.

Figure 7:
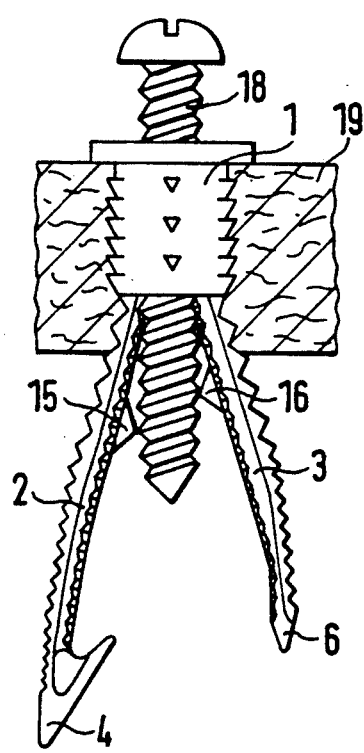
FIG. 7 is a view similar to FIG. 6 showing the screw screwed-in and the fingers spread apart.

When a screw 18 is then screwed into the plug as shown in FIG. 7, the walls 22 of the shank part 1 surrounding round hole 10 are forced apart, so that the shank 1 is transformed from its generally elliptical shape more into a cylindrical form and, in doing so, forces serrations 7 into the gypsum board. This helps to prevent the plug from rotating in the hole in the gypsum board as the screw is screwed in. As the thread of screw 18 enters the space between the spreading cams 15 and 16, the spreading fingers 2 and 3 will be disengaged from each other at the tip end 4 and forced outwardly and against the rear side of board 19.

Figure 8:
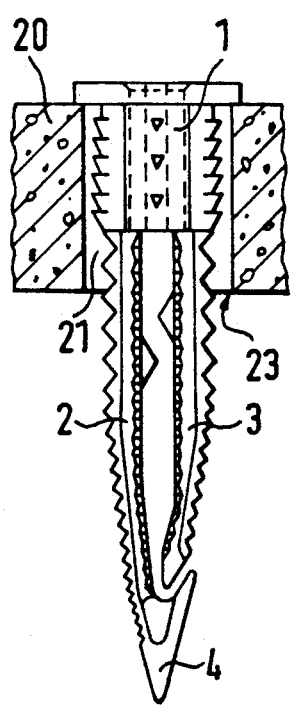
FIG. 8 shows the insertion of the plug in a hole in a relatively hard bearer element.
Figure 9:
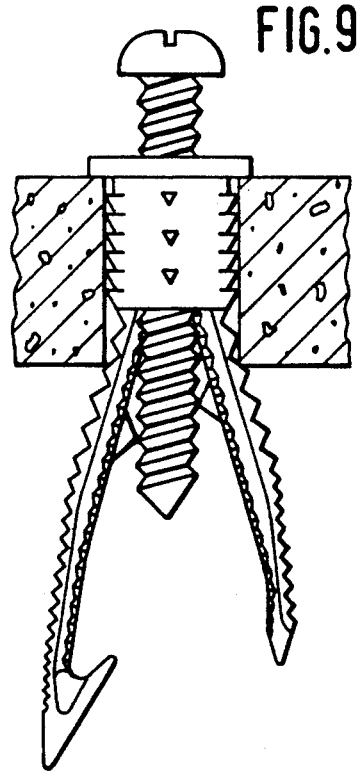
FIG. 9 is a view similar to FIG. 8 with the screw screwed-in and the fingers spread apart.

FIG. 8 shows the use of the plug with a bearer element 20 made of a relatively hard material. Here a hole 21 is first drilled in the element, which hole is, in diameter, somewhat smaller than the shank width "B" but somewhat larger than the shank thickness "D". Screw 18 is then screwed in as before, the shank walls 22, as previously described, initially pressing outwardly against the inner walls of the hole 21, while the spreading fingers 2 and 3 are spread apart and bear against the inner rim 23 of the hole in the element. The initial elliptical shape of the shank part 1 ensures in this case also that the plug does not rotate in the hole 21 while screw 18 is being screwed in.

Of course, the present plastic anchoring plug can also be used with solid bearer material, such as concrete or stone walls with pre-drilled blind holes with equally good anchoring characteristics. This clearly illustrates the universal nature of the plug according to the invention, because it can be used both in respect of soft and hard bearer materials.

We claim:

1. An anchoring plug of a hard elastic plastic material for fastening objects to bearer elements comprising a shank portion having a central opening extending therethrough, a pair of downwardly extending spreading fingers located on opposite sides of the center line of the opening and connected at their upper ends to said shank portion, one spreading finger being longer than the other spreading finger and having a hook-shaped, pointed tip at its free end opposite from said shank portion, said tip having an upwardly extending nose forming a recess therein, the free end of said shorter finger nesting in said recess and being held therein by said nose, whereby, after insertion of the plug into an element, insertion of a spreading member through the opening in the shank portion of the plug forces the shorter finger past the nose and out of said recess in the longer finger and spreads the fingers apart to grip the element.

2. The anchoring plug of claim 1, wherein the fingers from the shank portion down to their free ends are in the shape of a pointed arch.

3. The anchoring plug of claim 1, wherein the shank portion of the plug is elliptical in cross-section, said central opening having two channels on either side thereof that extend through said shank portion and outwardly toward the elliptical ends of the shank portion.

4. The anchoring plug of claim 1, including sawtooth serrations on the outer side edges of the spreading fingers.

5. The anchoring plug of claim 1, including spreading cams on the oppositely facing inner walls of the spreading fingers for engagement with the spreading member to help spread apart said fingers.

6. The anchoring plug of claim 5, wherein the cam on the shorter finger is engaged by the spreading member before the cam on the longer finger is engaged by the member.

* * * * *